United States Patent [19]

Miller

[11] 4,274,705
[45] Jun. 23, 1981

[54] FIBEROPTIC-FED FLUID LEVEL SENSOR USING A HEMIELLIPSOIDAL OPTICAL ELEMENT

[75] Inventor: Glen E. Miller, Redondo, Wash.

[73] Assignee: The Boeing Company, Seattle, Wash.

[21] Appl. No.: 78,214

[22] Filed: Sep. 24, 1979

[51] Int. Cl.³ .................. G02B 5/14; G01N 21/85
[52] U.S. Cl. ........................ 350/96.15; 350/96.10
[58] Field of Search ............. 350/96.10, 96.15, 96.16, 350/96.18, 96.24; 250/577; 356/135, 136, 137

[56] References Cited

U.S. PATENT DOCUMENTS

| | | | |
|---|---|---|---|
| 3,120,125 | 2/1964 | Vasel | 250/577 X |
| 3,886,544 | 5/1975 | Narodny | 350/96.15 X |
| 4,069,838 | 1/1978 | Hansel et al. | 250/577 X |
| 4,082,959 | 4/1978 | Nakashima | 250/577 |
| 4,094,578 | 6/1978 | DiVita et al. | 350/96.15 |
| 4,119,860 | 10/1978 | Gooley | 250/577 |
| 4,134,022 | 1/1979 | Jacobsen | 250/577 |
| 4,156,149 | 5/1979 | Vaccari | 250/577 |

FOREIGN PATENT DOCUMENTS 906609 9/1962 United Kingdom ............... 250/577

OTHER PUBLICATIONS

Lean, "Taps for Multimode Fibers", *IBM Tech. Discl. Bull.*, vol. 21, No. 4, Sep. 1978, p. 1685.

*Primary Examiner*—John K. Corbin
*Assistant Examiner*—John D. Lee
*Attorney, Agent, or Firm*—Cole, Jensen & Puntigam

[57] ABSTRACT

Two fiberoptic cables are connected to a transparent hemiellipsoidal optical element at the foci thereof, at the back surface portion of the element. The fiberoptic cables are arranged so that their central axes, if continued into the element, would intersect approximately at the point of tangency on the curved front surface portion of the element with an imaginary plane parallel to the back surface portion. The geometry of the optical element is such that light entering the optical element through one fiberoptic cable is (1) substantially completely internally reflected in the optical element and exits through the other fiberoptic cable when the optical element is submerged in a first medium, and (2) substantially completely transmitted through the optical element into the surrounding medium when the element is in a second medium having a different index of refraction than the first medium.

10 Claims, 9 Drawing Figures

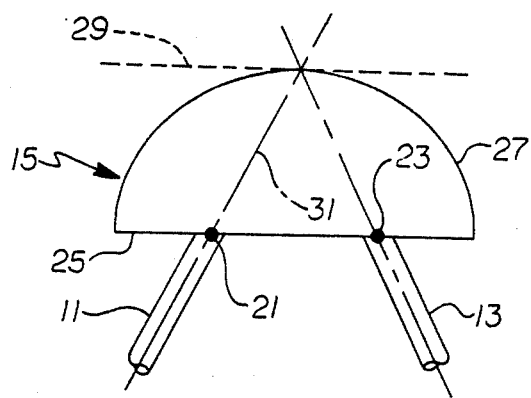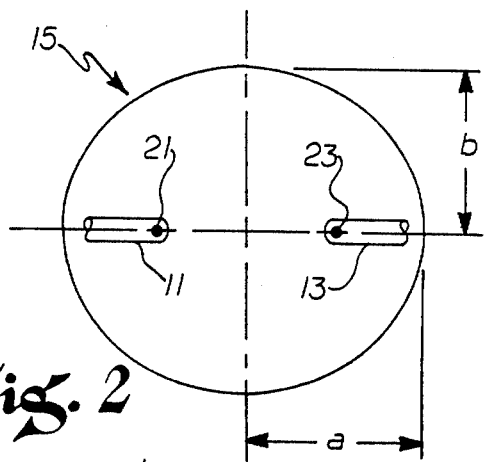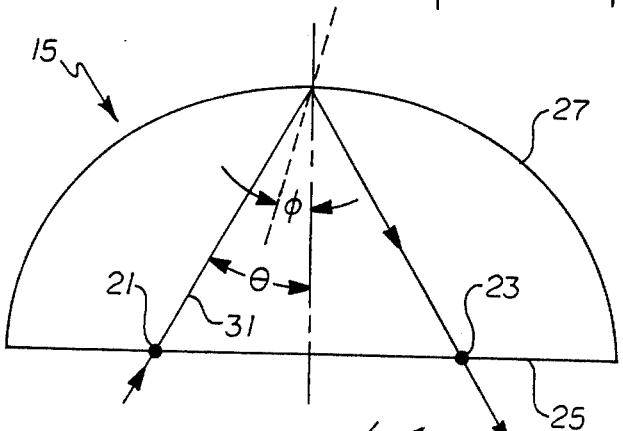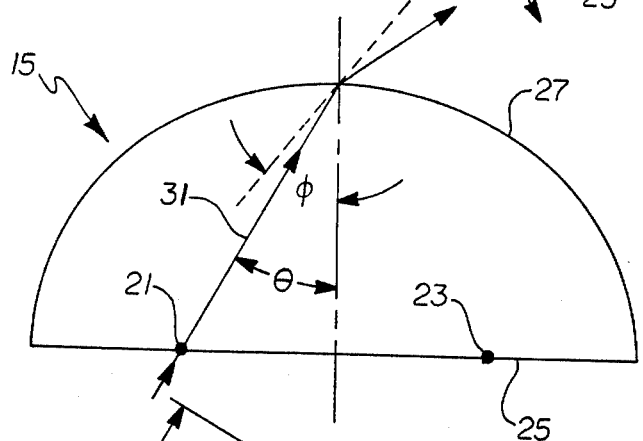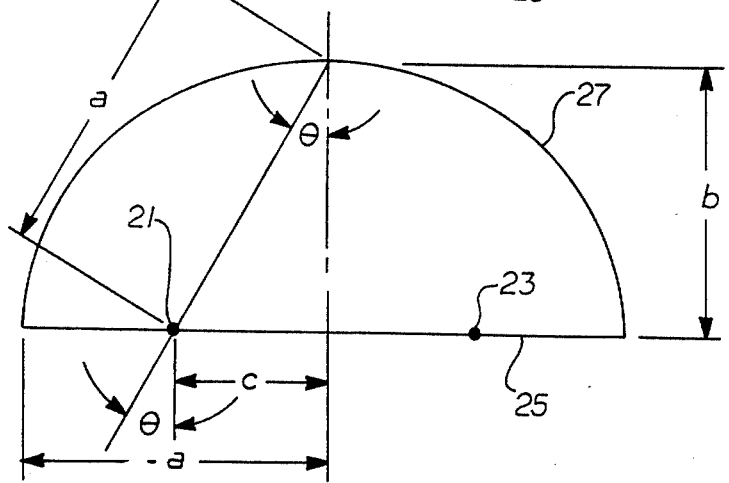
Fig. 1
Fig. 2
Fig. 3
Fig. 4
Fig. 5

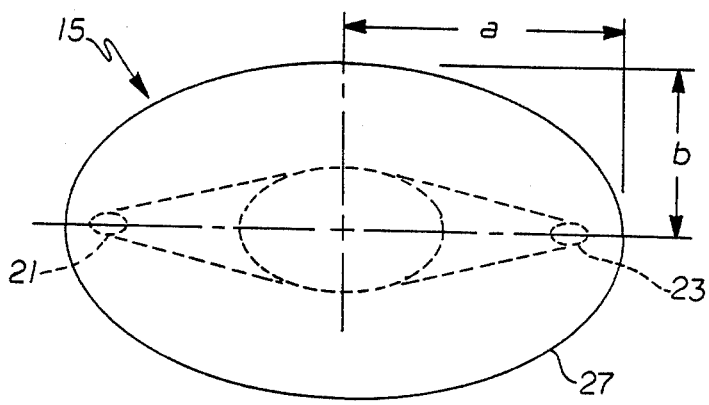
Fig. 6a
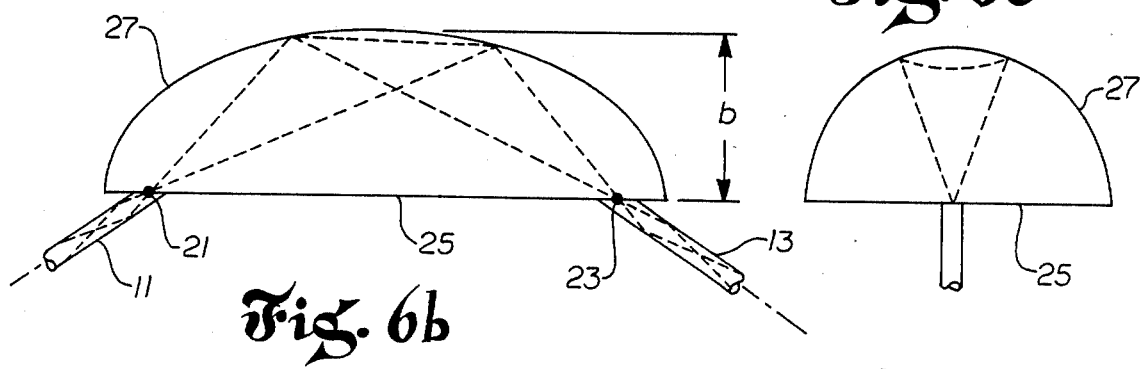
Fig. 6c
Fig. 6b
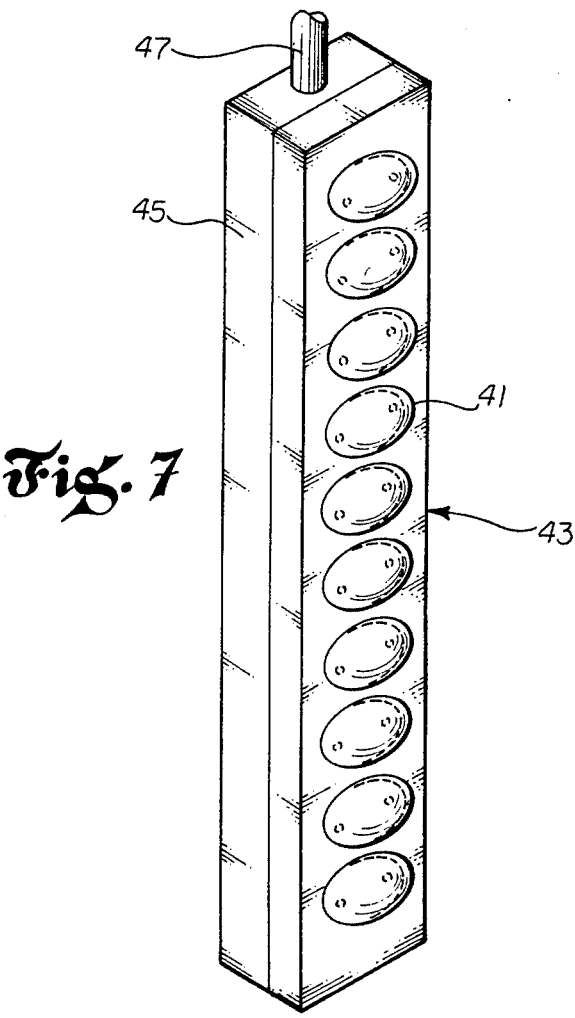
Fig. 7

4,274,705

FIBEROPTIC-FED FLUID LEVEL SENSOR USING A HEMIELLIPSOIDAL OPTICAL ELEMENT

The government has rights in this invention pursuant to Contract No. N00019-77-C-0039 awarded by the United States Department of the Navy.

BACKGROUND OF THE INVENTION

This invention relates generally to the art of fluid level sensors, such as might be used in gasoline or oil reservoirs, and more particularly concerns sensors which produce an output dependent upon the refractive index of the medium in which a sensing element portion is immersed.

In most fluid reservoirs, there is sensing apparatus for determining the existing level of the fluid. Typical examples of such reservoirs are fuel reservoirs in aircraft and in vehicles such as automobiles, or storage tank facilities of various kinds. In many of these applications, it is important that the sensing apparatus be electrically passive, and for that reason, sensors have been developed which use the properties of light to determine fluid level. In such sensors, the light entering the sensing element is either refracted into the medium in which it is immersed, or reflected back to a readout apparatus, depending on the critical angle of the element/medium combination and the angle of the entering light. The angle of the entering light is controlled so that for a medium of interest, i.e. gasoline, it is greater than the critical angle, resulting in reflection, while for another medium, i.e. air, it is less than the critical angle, resulting in refraction. The light output, which will thus vary depending on the medium in which the element is located, thus indicates whether or not the element is in or out of the particular medium of interest.

A wide variety of sensors based on this basic optical principle are known, although such sensors have not been previously widely used, due to several significant disadvantages. First, the outputs of many of the sensors are not reliable and are sometimes difficult to interpret. Also, the performance of such sensors often quickly degrade with continued use. Such sensors often require frequent repair and/or replacement, and are usually quite complex, both in operation and configuration, which increases the chances of failure, and/or incorrect results. A complex configuration, for instance, permits buildup of contaminants on the surface of the sensor, leading to a decrease in accuracy.

Accordingly, a general object of the present invention is to provide a sensor which is capable of overcoming one or more of the disadvantages of the prior art noted above.

It is another object of the present invention to provide such a sensor which is capable of accurately determining the boundary between two mediums, having different indexes of refraction, such as gasoline and air.

It is an additional object of the present invention to provide such a sensor which is configured so that substantially all of the light entering a sensing element portion of the sensor is reflected to an exit point when the sensor is immersed in a first medium, and so that substantially all of the light entering the sensing element portion is refracted out of the sensing element into the surrounding medium when the sensor is immersed in a second medium having a different index of refraction than the first medium.

It is a further object of the present invention to provide such a sensor which is so configured that contaminants do not build up on its surface during use.

It is an additional object of the present invention to provide such a sensor which includes a plurality of sensing elements formed into an array.

It is a still further object of the present invention to provide such a sensor which has an output which is substantially independent of the angle of the light entering the sensing element.

SUMMARY OF THE INVENTION

Accordingly, the present invention is a sensor apparatus which is useful in determining fluid level, and includes an optical element which has first and second foci and an opposed reflecting surface which has such a configuration that (1) light which enters the optical element through the first focus, at substantially any angle, when reflected from the opposed reflecting surface, will exit from the element through the second focus, and (2) light which enters the first focus will impinge on the opposed reflecting surface at substantially the same angle of incidence regardless of the angle at which the light entered. Connected to the optical element at the first and second foci are, respectively, first and second fiberoptic cable means. Light enters the optical element through one of the fiberoptic cable means, and reflected light exits from the optical element through the other fiberoptic cable means. The optical element is further configured so that light entering the optical element through the one fiberoptic cable means is (1) substantially completely internally reflected and exits through the other fiberoptic cable when the optical element is in a first medium, and further, is (2) substantially completely transmitted through said optical element and thus does not exit through the other fiberoptic cable when the element is in a second medium having a different index of refraction than the first medium.

DESCRIPTION OF THE DRAWINGS

A more thorough understanding of the invention may be obtained by a study of the following description taken in connection with the accompanied drawings in which:

FIG. 1 is a top plan view of the sensor of the present invention, showing entry and exit fiberoptic cables.

FIG. 2 is a back elevational view of the sensor of FIG. 1.

FIG. 3 is a top plan view of the optical element portion of the sensor of FIG. 1, showing in detail the path of a beam of light through the optical element, relative to the critical angle $\Phi$, when the critical angle is less than the angle of incidence $\theta$ of the entering beam.

FIG. 4 is a top plan view, similar to that of FIG. 3, for a critical angle $\Phi$ greater than the angle of incidence $\theta$.

FIG. 5 is a top plan view of the optical element portion of the sensor of FIG. 1, showing several aspects of the geometry of the optical element.

FIGS. 6(a) through (c) show front elevational, plan and side elevational views, respectively, of the optical element portion of the sensor of the present invention with a particular geometry, and a range of light paths within the element.

FIG. 7 is a perspective view showing a simplified array of optical elements formed into a multiple level sensor.

DESCRIPTION OF THE PREFERRED EMBODIMENT

Referring to FIGS. 1 and 2, the general configuration of the sensor of the present invention is shown. The sensor includes two fiberoptic cables 11 and 13 with one of the fiberoptic cables, i.e. cable 11, carrying light from a source (not shown) into an optical element 15, while the other fiberoptic cable, i.e. cable 13, receives light reflected internally of optical element 15 and carries it back to a readout means (not shown) or similar device.

In operation, optical element 15 is positioned at some fixed point in a fluid or gas reservoir, such as a fuel tank. The fiberoptic cables 11 and 13 join the optical element 15 to a light source and a readout or other output device, respectively. Light sources capable of illuminating the optical element and readouts, both direct and optoelectronic, which convert the light received from the element into an analog or decimal numerical equivalent or other comprehendible format, are well known in the art, and hence are not described in detail in this application.

The fiberoptic cables 11 and 13 are also conventional, comprising one or more optical fibers, such as are available commercially from various manufacturers. The details of the fiberoptic cables may vary from application to application, depending upon the environment in which the sensor is to operate. In a caustic fluid, such as gasoline, the optical cable will probably be made out of glass, which is more impervious to such a fluid than other materials. However, the specific structure of, and the material comprising, the fiberoptic cable is not considered to be a critical part of the present invention.

The optical element 15 in FIGS. 1 and 2 is a hemiellipsoidal element comprising a substantially transparent material, such as for instance, glass or plastic. Element 15 has a semimajor axis "a" and a semiminor axis "b" with two foci 21 and 23. The element shown in FIGS. 1 and 2 includes a flat back surface portion 25 which extends through the two foci 21 and 23, and a curved front surface portion 27. Element 15 is one half of an ellipsoid, so that viewed from the back, the outline of the element forms an ellipse. The ellipsoid in FIGS. 1 and 2 is sectioned through the foci of the elipse. However, it should be understood that the back surface need not be flat, that it may take various configurations, although the connection of the fiberoptic cables should be made at the foci.

The fiberoptic cables 11 and 13 are attached to the back surface portion 25 of the element at the foci 21 and 23. They are at such an angle in the horizontal plane relative to the back surface portion 25 that their center lines intersect in the embodiment shown approximately at a point on the curved front surface portion 27 of the element which is the point of tangency between the front surface portion 27 and an imaginary line 29 which is parallel with the back surface portion 25.

With the proper geometry, i.e. when the semimajor axis and the semiminor axis have the correct relative values, light entering optical element 15 through fiberoptic cable 11 is reflected off the interior of the curved front surface portion 27 into the fiberoptic cable 13 when the optical element is in a medium of low refractive index, such as air. From optics, for a particular optical element having a refractive index $N_1$ and a particular surrounding medium having a refractive index of $N_2$, the angle of light incident on the surface 27 which is the boundary angle between reflection and refraction is referred to as the critical angle of the combination. For a particular combination, light having an angle of incidence greater than the critical angle of the combination will be reflected back into the optical element, while light having an angle of incidence less than the critical angle will be refracted into the surrounding medium. The critical angle for a particular system is determined by the formula $\Phi = \sin^{-1} N_2/N_1$ where $\Phi$ is defined as the critical angle.

Thus, light entering the optical element of FIGS. 1 and 2 at an angle of incidence which is above the critical angle will be reflected back into the element and out the other fiberoptic cable, as shown in FIG. 3. The angle of incidence is determined relative to a reference line which is normal to a tangent to the curved front surface at the point of contact with the curved surface portion by the entering light ray. FIG. 3 shows the path of light through element 15 along a line 31 for a surrounding medium with a low refractive index, such as air, and hence, a combination of medium and element having a relatively low critical angle. Virtually all of the light entering the optical element located in such a medium through cable 11 will exit through cable 13 and be carried to the system readout.

However, for other surrounding mediums which have a higher refractive index, such as gasoline, the critical angle increases significantly, such as shown in FIG. 4, to the point where the light entering the element along line 31 will have an angle of incidence less than the critical angle. In such a case, the light ray is virtually all refracted out of element 15 into the surrounding medium. Thus, when the optical element is in a fuel, such as gasoline, which has a relatively high refractive index, and the combination of medium and element thus has a relatively large critical angle, the light entering the element will be refracted out into the medium, so that very little light reaches the output of the sensor. Thus, various mediums can be distinguished by observation of the output of the sensor.

The hemiellipsoidal optical element 15 has several significant characteristics which make it useful in the sensor of the present invention. First, a light ray entering optical element 15 at focus 21 at substantially any angle relative to the flat back surface portion 25 is reflected from the curved front surface portion 27 and exits through the other focus 23. Second, the angle of incidence of a light ray entering optical element 15 through focus 21 on curved front surface portion 27 will remain substantially the same for a wide range of entering angles relative to flat portion 25. Thus, the point of exit, i.e. focus 23, for light entering the optical element at focus 21 is substantially independent of the angle of entry of the light and hence the point on the curved front surface portion where the light is reflected, and further, the angle of incidence of the entering light is substantially independent of angle of entry of the light through focus 21.

In addition, for an ellipsoid of any given proportions, all light rays, regardless of their angle of incidence, which enter at one focus, are reflected from the ellipsoidal surface, and exit through the second focus, traverse identical distances in the ellipsoid. This is a basic mathematical property of an ellipsoid. Because of this property, all light rays which travel through an ellipsoidal sensor element suffer identical delays. Thus, coherent light rays entering an ellipsoidal sensor element with a given phase relationship also exit the sensor element with the same phase relationship. This feature allows such a sensor to operate efficiently with coherent light, as from a laser.

In order that the light entering the optical element when the element is in a first surrounding medium be totally refracted, and that the light entering the optical element when the element is in a second surrounding medium be totally reflected, so that the two conditions may be easily distinguished, the geometry of the optical element must be specially designed to the interrelationship of the refractive indexes of the surrounding media and the optical element.

For a first surrounding medium having the lower refractive index $N_2$ of two given media, the angle of incidence of the entering light must be greater than the critical angle $\Phi_1$ of the combination of the optical element and the first medium for total reflection to occur. For a surrounding medium having the larger refractive index of $N_2'$ of the two given media, the angle of incidence of the entering light must be less than the critical angle $\Phi_2$ of the combination of the optical element and the second medium for total refraction to occur.

In solving for the correct angle of incidence which would meet the above criteria for the two given media, the critical angles $\Phi_1$ and $\Phi_2$ must first be calculated. The critical angle for the medium having the lower refractive index will be smaller than the critical angle for the medium having the greater refractive index. An angle of incidence $\theta$ which leads to the desired results, i.e. substanstantially total reflection for one surrounding medium and substantially total refraction for the other surrounding medium, will be between the two critical angles $\Phi_1$ and $\Phi_2$. An angle of incidence $\theta$ which is intermediate of the two critical angles can be calculated as follows:

$$\theta = \frac{\Phi_1 + \Phi_2}{2},$$

where $\Phi_1$ is the critical angle for the surrounding medium having the index of refraction $N_2$, and $\Phi_2$ is the critical angle for the surrounding medium having the index of refraction $N_2'$. Since $\Phi = \sin^{-1} N_2/N_1$, then $$\theta = \frac{\sin^{-1} \frac{N_2}{N_1} + \sin^{-1} \frac{N_2'}{N_1}}{2}$$

This can be reduced to $$\theta = \sin^{-1} \frac{N_2 + N_2'}{2N_1}$$

Referring now to FIG. 5, for an ellipsoid element having a semimajor axis "a" and a semiminor axis "b", the angle of incidence $\theta = \sin^{-1} c/a$. The two distances labeled "a" in FIG. 5 are equal, as a property of an ellipse. Since, from geometry, $c^2 = a^2 - b^2$ in FIG. 5, then $$\theta = \sin^{-1} \frac{(a^2 - b^2)^{\frac{1}{2}}}{a}.$$

Thus, for an element having a refractive index $N_1$, $$\sin^{-1} \frac{(a^2 - b^2)^{\frac{1}{2}}}{a} = \sin^{-1} \frac{N_2 + N_2'}{2N_1}.$$

-continued $$\frac{a^2 - b^2}{a^2} = \left(\frac{N_2 + N_2'}{2N_1}\right)^2$$

$$1 - \frac{b^2}{a^2} = \left(\frac{N_2 + N_2'}{2N_1}\right)^2 \text{ and}$$

$$\frac{b}{a} = \left[1 - \left(\frac{N_2 + N_2'}{2N_1}\right)^2\right]^{\frac{1}{2}}$$

If $N_1$, for instance, is 1.47 (borosilicate glass), and $N_2$ equals 1.00 (air) and $N_2'$ equal 1.40 (jet engine fuel), then $$\frac{b}{a} = \left[1 - \left(\frac{1 + 1.4}{2.94}\right)^2\right]^{\frac{1}{2}} = 0.578,$$

which is a 35.28° ellipse. The angle of incidence $\theta = \cos^{-1} b/a = 54.7$ degrees. Thus, for the example given above, the optical element 15 must be configured in a 35.28° ellipsoid, and the angle of incidence of the entering light should be approximately 54.7 degrees.

FIGS. 6a-6c show the hemiellipsoid element 15 drawn to the approximate configuration for the above example. The dotted lines in the figures define the boundaries of a cone of light resulting from a fiberoptic cable having a numerical aperture of 0.2. It should be understood, however, that the present invention may be used with fiberoptic cables covering a broad range of numeral apertures, i.e. at least from 0.7 to 0. For a fiberoptic cable having a numerical aperture of 0.2, not all of the light rays entering the optical element will intersect the curved front surface 27 at one point, but will form a pattern in the general shape of a cone. This is true for the light reflected from the curved surface 27 to the exiting fiberoptic cable 13 as well.

From an inspection of FIGS. 6a-6c, which shows the anticipated pattern of light for a fiberoptic cable having a particular numerical aperture and the resulting light pattern within element 15, it is apparent that only the section of the curved front surface portion 27 which corresponds to the area over which the entering light impinges need conform to the calculated geometry of the optical element. The remainder of the curved front surface portion of the optical element can be made to any convenient shape, such as may be convenient for mounting the optical element.

In some applications, it is possible to approximate a portion of the curved surface 27 with a circular contour having a radius of $r = a^2/b$. This results in a close approximation of the true elliptical contour necessary for the area of interest, and should not seriously effect the efficiency of the optical element, provided that the fiberoptic cables 11 and 13 have a relatively low numerical aperture.

Referring now to FIG. 7, a sensor comprising an array of optical elements is shown. Such an array, for instance, may be inserted into a reservoir for sensing multiple discrete levels of fuel or the like. The plurality of optical elements 41—41 may be conveniently cast or molded as part of a single strip or section of glass 43, with the glass strip being mounted on a base 45. The optical elements 41—41 are fed through a bundle of fiberoptic cables 47. Hence, the present invention permits the construction of low cost arrays which result in a fuel level sensor which is accurate and dependable and also practical.

Although a preferred embodiment of the invention has been disclosed herein for purposes of illustration, it should be understood that various changes, modifications and substitutions may be incorporated in such an embodiment without departing from the spirit of the invention, as defined by the claims which follow.

What is claimed is:

1. A sensor apparatus useful in determining fluid level comprising:

an optically-transparent optical element having a convex hemiellipsoidal front surface, the boundary of the optical element encompassing the first and second foci of the front surface, such that (1) light entering said optical element through said first focus at substantially any angle, if reflected from the front surface of said optical element, exits through the second focus, and (2) light entering through the first focus impinges on the front surface at substantially the same angle of incidence substantially regardless of the angle at which the light entered through the first focus; and first and second fiberoptic cable means connected to the optical element in a fixed relationship thereto, terminating at the respective foci thereof, one of said fiberoptic cable means functioning to permit light to enter the optical element, the other to receive light exiting from the optical element, said optical element being further configured so that light entering the optical element through the one fiberoptic cable means is (1) substantially completely internally reflected and exits through the other fiberoptic cable means when said optical element is in a first medium, and is (2) substantially completely transmitted through said optical element and thus does not exit through the other fiberoptic cable means when the element is in a second medium having a different index of refraction than said first medium.

2. The apparatus of claim 1, wherein said optical element has a flat back surface where said foci are located.

3. The apparatus of claim 2, wherein said foci are in the same plane as the semimajor axis of said optical element.

4. The apparatus of claim 3, wherein said fiberoptic cable means are positioned at specified angles relative to said back surface of said optical element.

5. The apparatus of claim 4, wherein the fiberoptic cable means are located at such an angle that the central axes thereof intersect approximately at a point on said front surface of said optical element which coincides with the point of tangency between said front surface and an imaginary plane parallel to said back surface of said optical element.

6. The apparatus of claim 3, wherein light entering and exiting said optical element through said fiberoptic cable means forms a cone of light which impinges over a given area of said front surface, and wherein only said given area has said particular configuration.

7. The apparatus of claim 3, including a plurality of said optical elements, each having said first and second fiberoptic cable means, said plurality of optical elements being arranged into an array on a base surface, so that, when said array is positioned in a fluid reservoir, a sequential indication of changing levels of fluid within the reservoir is provided.

8. A sensor useful with light conducting means through which light enters and exits the sensor to determine fluid level, comprising:

an optically transparent optical element to which the light conducting means are secured in a fixed relationship thereto, the optical element having a convex hemiellipsoidal front surface, the boundary of the optical element encompassing the first and second foci of the front surface, such that (1) light entering said optical element through said first focus at substantially any angle, if reflected from the front surface of said optical element, exits through the second focus, and (2) light entering through the first focus impinges on the front surface at substantially the same angle of incidence substantially regardless of the angle at which the light entered through the first focus, said optical element being further configured so that light entering the optical element through the first focus is (1) substantially completely internally reflected and exits through the second focus when said optical element is in a first medium, and is (2) substantially completely transmitted through said optical element and thus does not exit through the second focus when the element is in a second medium having a different index of refraction than said first medium.

9. The article of claim 8, wherein the first and second foci are in the same plane as the semimajor axis of said optical element.

10. The article of claim 8, wherein light entering and exiting from the optical element forms a cone of light which impinges over a given area of said front surface, and wherein only said given area has said particular configuration.

* * * * *